United States Patent

[11] 3,590,296

[72] Inventor Rene Dumez
 Saint-Cloud, France
[21] Appl. No. 863,429
[22] Filed Oct. 3, 1969
[45] Patented June 29, 1971
[73] Assignee Aciers Et Outillage Peugeot
 Levallois-Perret, France
[32] Priority Dec. 20, 1968
[33] France
[31] 179,481

[54] ELECTRIC ROTATING MACHINE
 2 Claims, 2 Drawing Figs.
[52] U.S. Cl. .................................................. 310/234
[51] Int. Cl. ................................................. H02k 13/04
[50] Field of Search ........................................... 310/234,
 235, 270, 237, 233, 236

[56] References Cited
 UNITED STATES PATENTS
2,283,808  5/1942  Humphrey ..................  310/235
2,658,158 11/1953  Bender .......................  310/234
2,749,460  6/1956  Acton .........................  310/270
3,365,600  1/1968  Penn ..........................  310/270
3,447,011  5/1969  Amrein .......................  310/235
3,471,731 10/1969  Pratt ..........................  310/270

Primary Examiner—Milton O. Hirshfield
Assistant Examiner—R. Skudy
Attorney—Irving M. Weiner ABSTRACT: A rotating electric machine of the type in which the connection ends of the bars of the commutator are connected by connecting wires to the armature windings. Elements of insulating material are interposed between the connection ends of the commutator bars to preclude contact between the connecting wires.

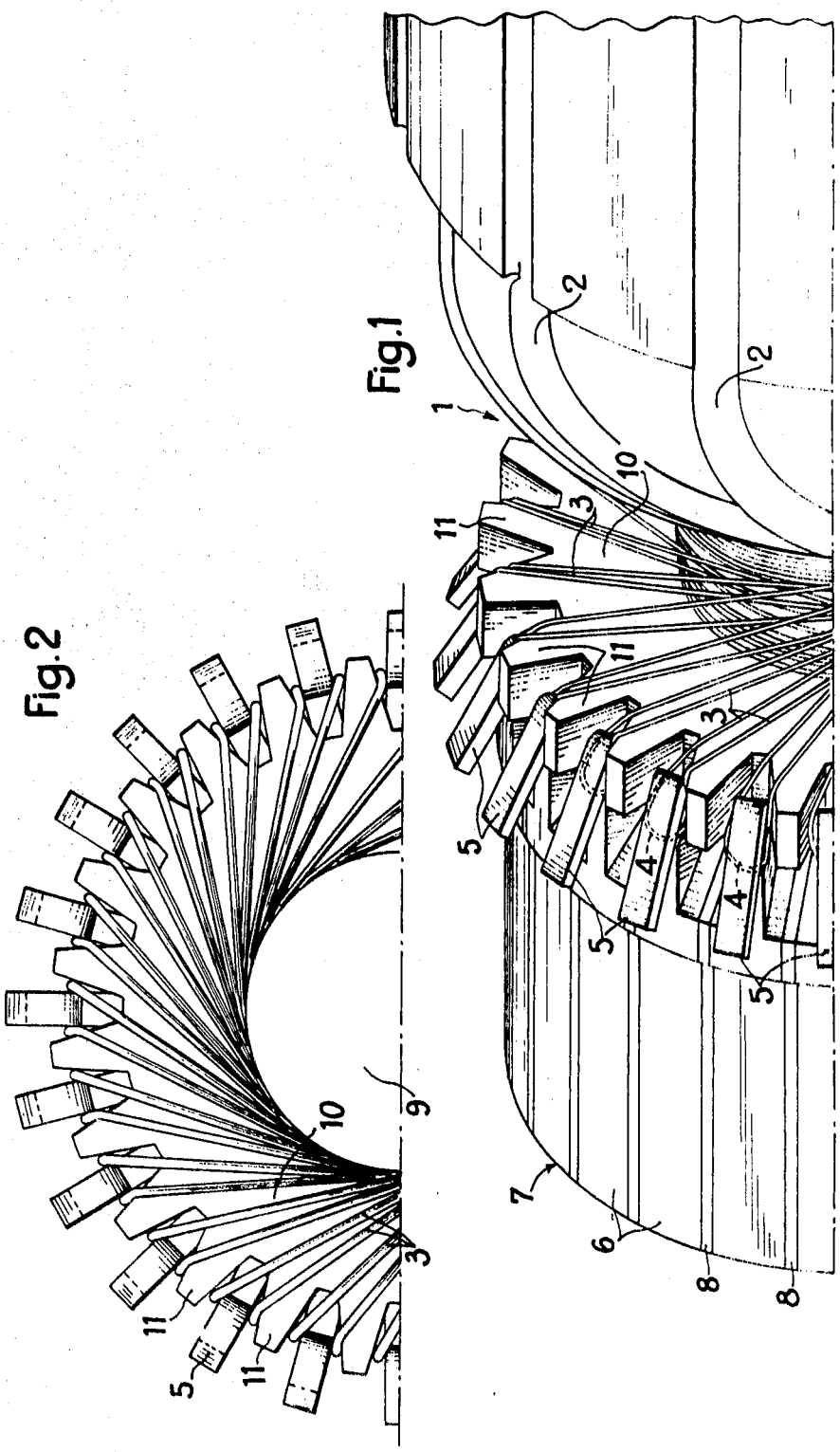

ELECTRIC ROTATING MACHINE

The present invention relates to electric rotating machines provided with a commutator and more particularly to low-power electric machines in which each bar or segment of the commutator is provided with a portion constituting a hook to which are attached the wire loops issuing from the armature windings of the machine.

It has been found in these types of electric machines that the wires connected to two consecutive bars of the commutator are liable to come in contact with each other during manufacture of the machine and in the course of its subsequent operation owing to for example handling, mechanical vibrations, movements of the wires upon acceleration of the rotor or action of the temperature. This contact between the wires in the region of the bars of the commutator is very harmful when the wires produce an electric contact since the corresponding windings of the armature are short-circuited.

The object of the present invention is to remedy this drawback.

The invention provides an electric machine having a commutator wherein the wires which connect the armature windings to the commutator and are connected to the bars adjacent the commutator are separated by elements of insulating material, said elements being interposed between the connection ends of said bars.

Further features and advantages of the invention will be apparent from the ensuing description with reference to the accompanying drawing.

In the drawing:

FIG. 1 is a partial perspective view of an armature of an electric machine having a commutator improved in accordance with one embodiment of the invention, and FIG. 2 is a partial view taken along line 2—2 of FIG. 1.

As can be seen in FIG. 1, which shows only the armature of an electric machine, the coil heads 2 have connection wires 3 which terminate in loops 4. The latter are hooked to end portions constituting hooks 5 which form part of the conductive bars or segments 6 of the commutator 7 of the machine. The conductive bars 6 are separated by insulating strips 8.

The connection wires issuing from the windings of the armature pass around the shaft 9 of the machine (not seen in FIG. 1) and are connected to the corresponding hooks 5 with the suitable angular offset (see FIG. 2).

An insulating washer 10 is combined with the commutator 7. It has on its periphery teeth 11 which constitute separating elements and are introduced respectively between the connection ends of the bars 6 of the commutator. The washer 10 can be of any suitable insulating material and it is keyed or fixed to the shaft 9.

Owing to the washer 10, the wire loops 4 adjacent thereto are held apart in that they are disposed on each side of the respective teeth of the washer.

Note that the invention is particularly effective in machines in which the commutator has a high number of bars or in which there is a large angular offset between the coil heads and their associated commutator bars.

Although a specific embodiment of the invention has been described, many modifications and changes may be made therein without departing from the scope of the invention.

Having now described my invention what I claim and desire to secure by Letters Patent is:

1. A rotating electric machine comprising a shaft, a commutator and an armature mounted on said shaft, said armature having windings and said commutator having commutator bars comprising connection ends, wires connecting said armature windings to respective ones of said connection ends of said bars said connection ends having freely extending extremities projecting in the direction of said armature and, provided between succeeding ones of said extremities, a protecting element of an insulating material so as to maintain separated from each other respective ones of said wires connected to said succeeding extremities.

2. A rotating electric machine comprising a shaft, a commutator and an armature mounted on said shaft, said armature having windings and said commutator having commutator bars having connection ends, wires connecting said armature windings to said connection ends of said bars and elements of an insulating material interposed between said connection ends of said bars, wherein said elements are teeth provided on the periphery of an insulating washer which is mounted on said shaft in a position adjacent said commutator.